United States Patent
Park et al.

(10) Patent No.: US 12,340,945 B2
(45) Date of Patent: Jun. 24, 2025

(54) MULTILAYER ELECTRONIC COMPONENT

(71) Applicant: SAMSUNG ELECTRO-MECHANICS CO., LTD., Suwon-si (KR)

(72) Inventors: Jin Soo Park, Suwon-si (KR); Eui Hyun Jo, Suwon-si (KR); Jun Hyeong Kim, Suwon-si (KR); Ha Jeong Kim, Suwon-si (KR); Hyun Hee Gu, Suwon-si (KR); Woo Kyung Sung, Suwon-si (KR); Myung Jun Park, Suwon-si (KR); Byung Jun Jeon, Suwon-si (KR); Chul Seung Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 209 days.

(21) Appl. No.: 18/081,079

(22) Filed: Dec. 14, 2022

(65) Prior Publication Data
US 2023/0230765 A1    Jul. 20, 2023

(30) Foreign Application Priority Data

Jan. 20, 2022 (KR) .......................... 10-2022-0008472
Jun. 2, 2022 (KR) .......................... 10-2022-0067773

(51) Int. Cl.
*H01G 4/232* (2006.01)
*H01G 4/012* (2006.01)
*H01G 4/12* (2006.01)
*H01G 4/30* (2006.01)

(52) U.S. Cl.
CPC ........... *H01G 4/2325* (2013.01); *H01G 4/012* (2013.01); *H01G 4/12* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 4,652,967 A | * | 3/1987 | Sakabe | H01G 4/302 29/25.42 |
| 6,320,738 B1 | * | 11/2001 | Yamana | H01G 4/30 361/306.3 |

(Continued)

FOREIGN PATENT DOCUMENTS

| | | |
|---|---|---|
| JP | 2002-015946 A | 1/2002 |
| JP | 2002280255 A * | 9/2002 |

(Continued)

OTHER PUBLICATIONS

Dwivedi et al., 'Hydrogen embrittlement in different materials : A review', International Journal of Hydrogen Energy 43 (2018) 21603-21616.

(Continued)

*Primary Examiner* — Eric W Thomas
(74) *Attorney, Agent, or Firm* — MORGAN, LEWIS & BOCKIUS LLP (57) ABSTRACT

A multilayer electronic component includes a body including a dielectric layer and internal electrodes stacked in a first direction with the dielectric layer interposed therebetween and external electrodes including a first electrode layer connected to the internal electrodes and including Ni, and a second electrode layer disposed on the first electrode layer and including an Ni—Cu alloy. A Cu content of the second electrode layer is 70 mol to 90 mol compared to 100 mol of the total content of Ni and Cu of the second electrode layer.

20 Claims, 8 Drawing Sheets

(56) References Cited

U.S. PATENT DOCUMENTS

| | | | |
|---|---|---|---|
| 2004/0107555 A1* | 6/2004 | Hattori | H01G 4/30 29/25.42 |
| 2013/0258546 A1 | 10/2013 | Kim et al. | |
| 2016/0379758 A1 | 12/2016 | Otani | |
| 2019/0180941 A1* | 6/2019 | Choi | H01G 4/30 |
| 2020/0126723 A1 | 4/2020 | Ooe et al. | |
| 2020/0312561 A1 | 10/2020 | Wakashima | |
| 2021/0005383 A1* | 1/2021 | Park | H01G 4/224 |
| 2021/0027945 A1 | 1/2021 | Takahashi et al. | |
| 2021/0035741 A1 | 2/2021 | Cho et al. | |
| 2021/0057153 A1 | 2/2021 | Jun et al. | |

FOREIGN PATENT DOCUMENTS

| | | |
|---|---|---|
| JP | 2017-011145 A | 1/2017 |
| JP | 2019-067829 A | 4/2019 |
| JP | 2020-167322 A | 10/2020 |
| KR | 10-2013-0111000 A | 10/2013 |

OTHER PUBLICATIONS

Sakamoto et al., 'The Electrochemical Determination of Diffusivity and Solubility of Hydrogen in Copper', J. Japan Inst. Metals, vol. 46, No. 3 (1982), pp. 285-290 with English Abstract.

Calderoni et al., 'High-Temperature Hydrogen Permeation in Nickel Alloys', Oct. 2010.

Extended European Search Report issued in corresponding European Patent Application No. 22215000.5 dated May 24, 2023.

* cited by examiner

MULTILAYER ELECTRONIC COMPONENT

CROSS-REFERENCE TO RELATED APPLICATION(S)

This application claims benefit of priority to Korean Patent Application Nos. 10-2022-0008472 filed on Jan. 20, 2022 and 10-2022-0067773 filed on Jun. 2, 2022, in the Korean Intellectual Property Office, the disclosures of which are incorporated herein by reference in its entirety.

TECHNICAL FIELD

The present disclosure relates to a multilayer electronic component.

BACKGROUND

A multilayer ceramic capacitor (MLCC), a multilayer electronic component, is a chip-type capacitor mounted on the printed circuit boards of various types of electronic products such as imaging devices including liquid crystal displays (LCDs) and plasma display panels (PDPs), computers, smartphones, cell phones, and the like, to allow electricity to be charged therein and discharged therefrom.

Such an MLCC may be used as a component of various electronic devices due to advantages thereof such as compactness, guaranteed high capacitance, and ease of mountability. As various electronic devices such as computers and mobile devices have been reduced in size and increased in power, demand for miniaturization and high capacitance of multilayer ceramic capacitors have been increased.

In general, in an MLCC, nickel (Ni) and/or tin (Sn) plating is performed on external electrodes to facilitate mounting on a substrate. The plating process is generally performed as electronic deposition or electroplating, but in this case, a plating solution may penetrate internally or hydrogen gas generated during plating may penetrate into internal electrodes to deteriorate the insulation resistance of the MLCC and, as a result, the reliability of the MLCC may be deteriorated.

SUMMARY

Exemplary embodiments provide a multilayer electronic component having excellent reliability by preventing penetration of hydrogen gas generated during plating.

Exemplary embodiments provide a multilayer electronic component in which the occurrence of radiating cracks is suppressed.

Exemplary embodiments provide a multilayer electronic component having excellent flexural strength.

According to an aspect of the present disclosure, a multilayer electronic component includes: a body including a dielectric layer and internal electrodes stacked in a first direction with the dielectric layer interposed therebetween; and external electrodes including a first electrode layer connected to the internal electrodes and including Ni, and a second electrode layer disposed on the first electrode layer and including an Ni—Cu alloy. A Cu content of the second electrode layer is 70 mol to 90 mol compared to 100 mol of the total content of Ni and Cu of the second electrode layer.

According to an aspect of the present disclosure, a multilayer electronic component includes: a body including a dielectric layer and internal electrodes stacked in a first direction with the dielectric layer interposed therebetween and including a first surface and a second surface opposing each other in the first direction, a third surface and a fourth surface connected to the first surface and the second surface and opposing each other in a second direction, and a fifth surface and a sixth surface connected to the first to fourth surfaces and opposing each other in a third direction; and external electrodes including a first electrode layer connected to the internal electrodes and including Ni, and a second electrode layer disposed on the first electrode layer and including an Ni—Cu alloy. The first electrode layer is disposed only on the third and fourth surfaces, among the first to sixth surfaces, and the second electrode layer extends to a portion of each of the first, second, fifth, and sixth surfaces.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, exemplary embodiments of the present inventive concept will be described in detail with reference to the accompanying drawings. The inventive concept may, however, be exemplified in many different forms and should not be construed as being limited to the specific exemplary embodiments set forth herein. Rather, these exemplary embodiments are provided so that this disclosure will be thorough and complete, and will fully convey the scope of the inventive concept to those skilled in the art. In the drawings, the shapes and dimensions of elements may be exaggerated for clarity, and the same reference numerals will be used throughout to designate the same or like elements.

Figure 1:
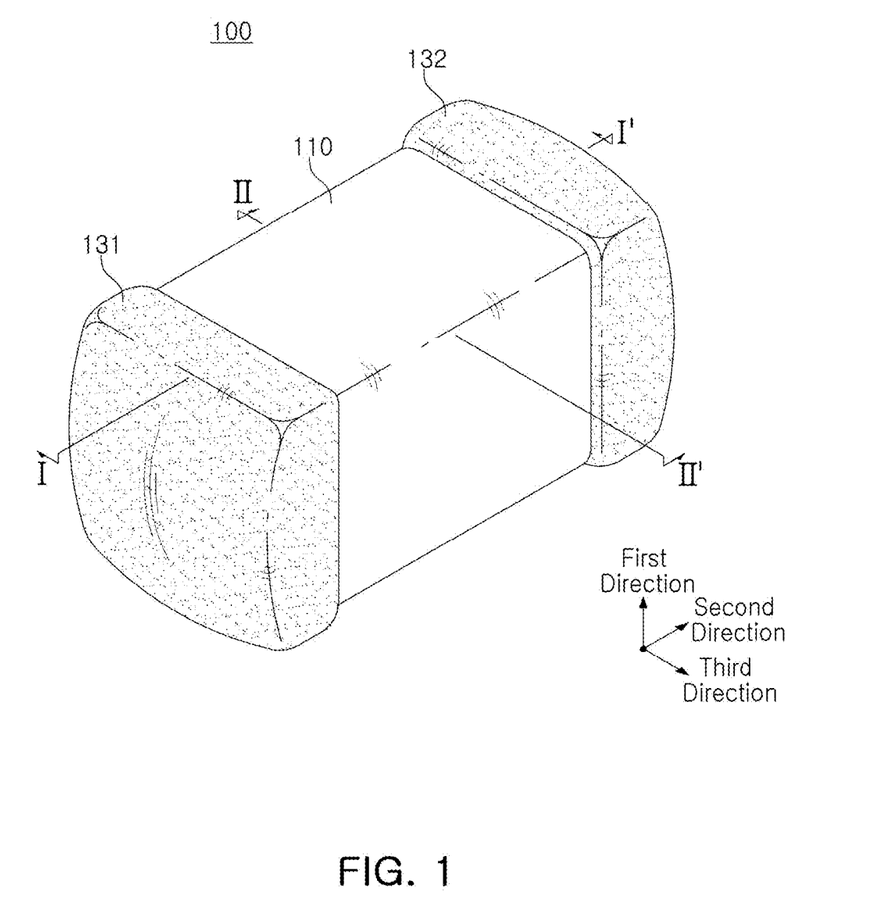
FIG. 1 is a perspective view schematically illustrating a multilayer electronic component according to an exemplary embodiment in the present disclosure.

To clarify the present disclosure, portions irrespective of description are omitted and like numbers refer to like elements throughout the specification, and in the drawings, the thickness of layers, films, panels, regions, etc., are exaggerated for clarity. Also, in the drawings, like reference numerals refer to like elements although they are illustrated in different drawings. Throughout the specification, unless explicitly described to the contrary, the word "comprise" and variations such as "comprises" or "comprising", will be understood to imply the inclusion of stated elements but not the exclusion of any other elements FIG. 1 is a perspective view schematically illustrating a multilayer electronic component according to an exemplary embodiment in the present disclosure.

Figure 2:
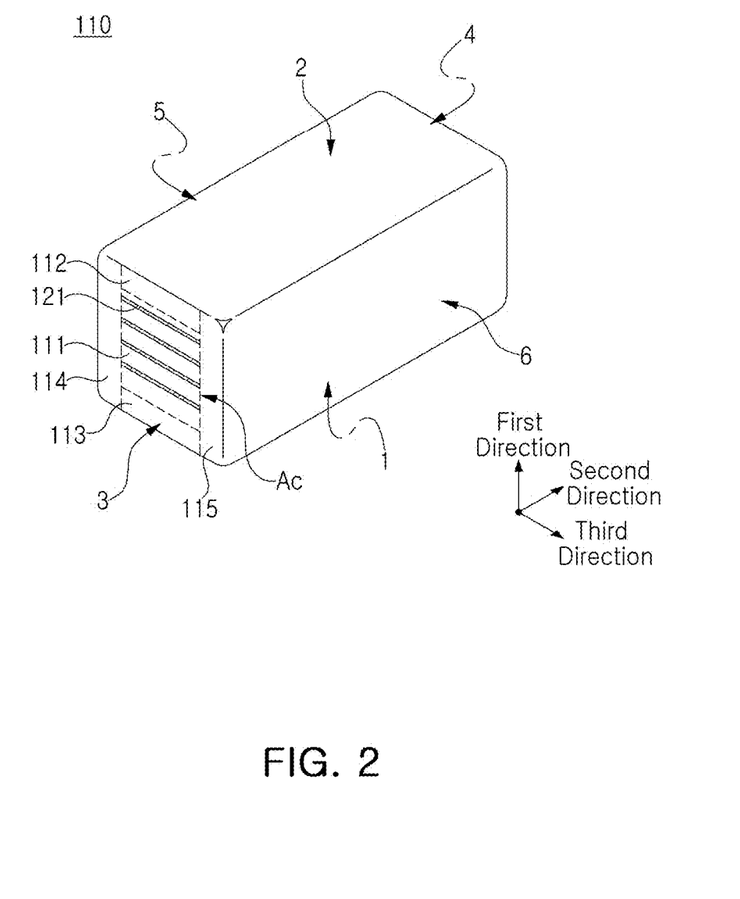
FIG. 2 is a perspective view schematically illustrating a body of the multilayer electronic component of FIG. 1.

FIG. 2 is a perspective view schematically illustrating a body of the multilayer electronic component of FIG. 1.

Figure 3:
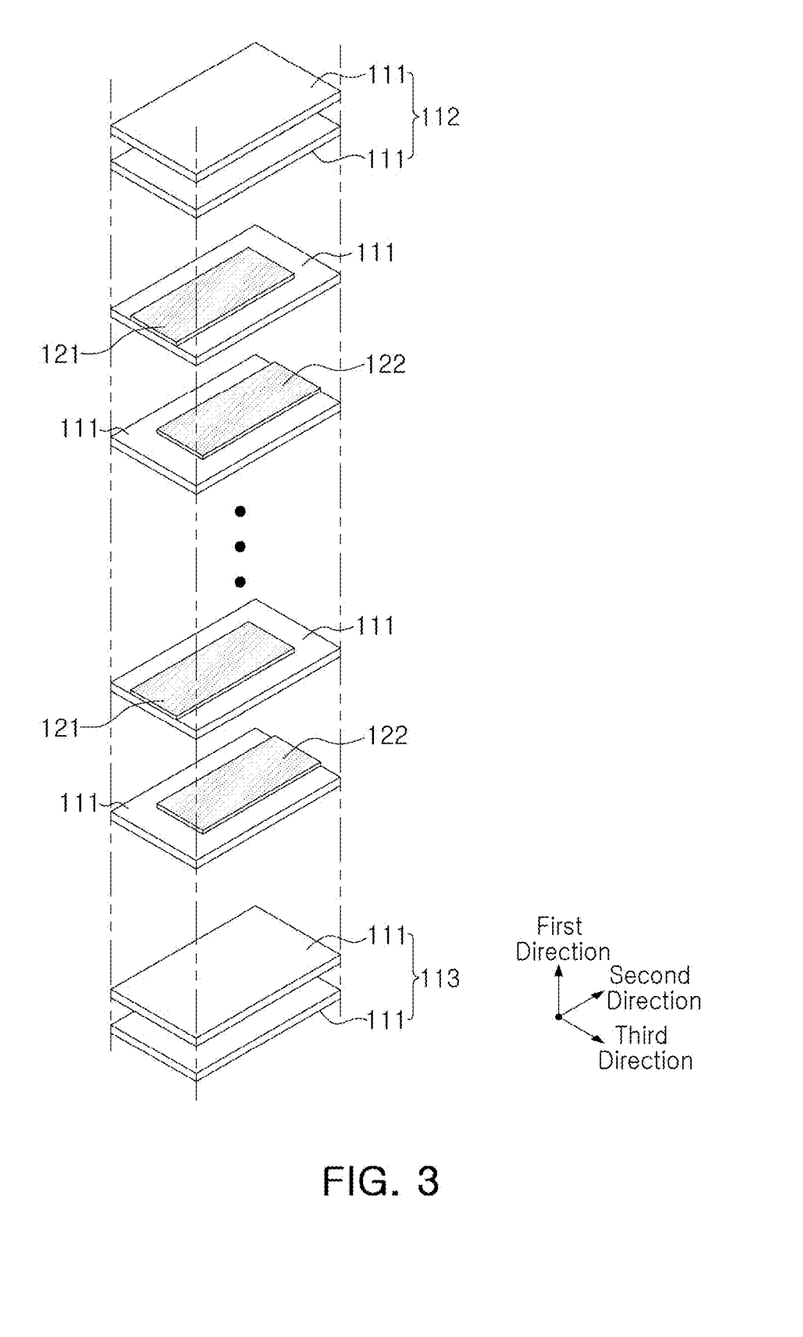
FIG. 3 is an exploded perspective view schematically illustrating an exploded body of a multilayer electronic component according to an exemplary embodiment in the present disclosure.

FIG. 3 is an exploded perspective view schematically illustrating an exploded body of a multilayer electronic component according to an exemplary embodiment in the present disclosure.

Figure 4:
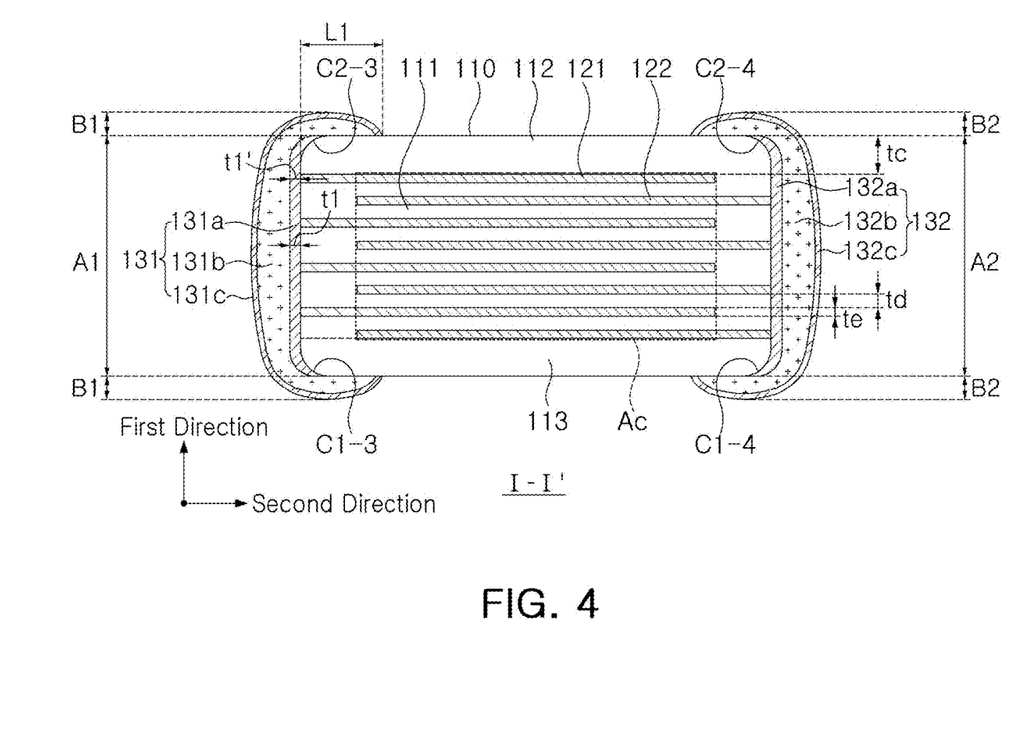
FIG. 4 is a schematic cross-sectional view taken along line I-I' of FIG. 1.

FIG. 4 is a schematic cross-sectional view taken along line I-I' of FIG. 1.

Figure 5:
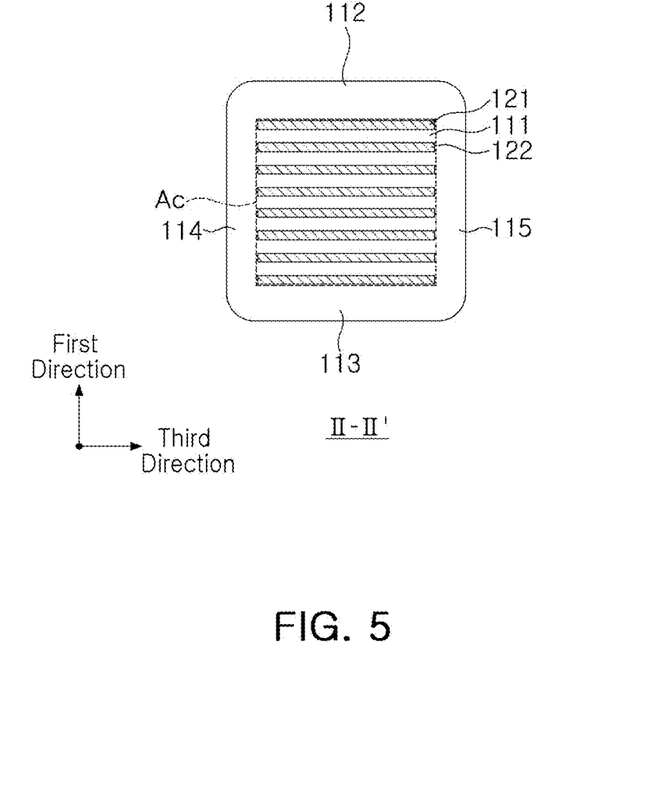
FIG. 5 is a schematic cross-sectional view taken along line II-II' of FIG. 1.

FIG. 5 is a schematic cross-sectional view taken along line II-II' of FIG. 1.

Referring to FIGS. 1 through 5, a multilayer electronic component 100 according to an exemplary embodiment in the present disclosure may include a body 110 including a dielectric layer 111 and internal electrodes 121 and 122 stacked in a first direction with the dielectric layer 111 interposed therebetween and external electrodes 131 and 132 including first electrode layers 131a and 132a connected to the internal electrodes 121 and 122 and including Ni, and second electrode layers 131b and 132b disposed on the first electrode layers 131a and 132a and including an Ni—Cu alloy. A Cu content of the second electrode layers 131b and 132b may be 70 mol to 90 mol compared to 100 mol of the total content of Ni and Cu of the second electrode layers 131b and 132b.

As described above, when the nickel (Ni) and/or tin (Sn) plating layer is formed on the external electrodes of a multilayer ceramic capacitor, a plating solution may penetrate internally or hydrogen gas generated during plating may penetrate into the internal electrodes to deteriorate insulation resistance of the multilayer ceramic capacitor, and as a result, reliability of the multilayer ceramic capacitor may be deteriorated.

However, the external electrodes 131 and 132 of the multilayer electronic component 100 according to an exemplary embodiment in the present disclosure include the second electrode layers 131b and 132b including a Ni—Cu alloy and the Cu content of the second electrode layer satisfies 70 mol to 90 mol compared to the total content of 100 mol of Ni and Cu, so that penetration of hydrogen gas into the internal electrodes 121 and 122 may be prevented, thereby further improving the reliability of the multilayer electronic component 100.

Hereinafter, each component included in the multilayer electronic component 100 according to an exemplary embodiment in the present disclosure will be described in more detail.

A specific shape of the body 110 is not particularly limited, but as shown, the body 110 may have a hexahedral shape or a similar shape. During a sintering process, due to shrinkage of ceramic powder included in the body 110 or grinding of the corners, the body 110 may not have a perfectly straight hexahedral shape but may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3, and 4 and opposing each other in a third direction.

The body 110 may have a first-third corner C1-3 connecting the first surface 1 and the third surface 3, a first-fourth corner C1-4 connecting the first surface 1 and the fourth surface 4, a second-third corner C2-3 connecting the second surface 2 and the third surface 3, and a second-fourth corner C2-4 connecting the second surface 2 and the fourth surface 4. In addition, the body 110 may include a first-fifth corner connecting the first surface 1 and the fifth surface 5, a first-sixth corner connecting the first surface 1 and the sixth surface 6, a second-fifth corner connecting the second surface 2 and the fifth surface 5, and a second-sixth corner connecting the second surface 2 and the sixth surface 6. As the edges connecting each surface of the body 110 are rounded by performing a separate process, the corner may have a round shape. The first to sixth surfaces of the body 110 may be generally flat surfaces, and non-flat regions may be considered to be corners.

In the body 110, a dielectric layer 111 and internal electrodes 121 and 122 may be alternately stacked. The plurality of dielectric layers 111 forming the body 110 are in a sintered state, and adjacent dielectric layers 111 may be integrated such that boundaries therebetween may not be readily apparent without using a scanning electron microscope (SEM).

The dielectric layer 111 may be formed by preparing a ceramic slurry including ceramic powder, an organic solvent, and a binder, applying and drying the slurry on a carrier film to prepare a ceramic green sheet, and then sintering the ceramic green sheet. The ceramic powder is not particularly limited as long as sufficient electrostatic capacitance may be obtained therewith. For example, a barium titanate-based ($BaTiO_3$)-based powder may be used.

An average thickness td of the dielectric layer is not particularly limited. Meanwhile, in order to achieve miniaturization and high capacitance of the multilayer electronic component 100, it is necessary to increase the number of stacked layers by reducing the thickness of the dielectric layer 111, but in the related art, as the thickness of the dielectric layer 111 is reduced, insulation resistance may be easily degraded, and as a result, the reliability of the multilayer electronic component 100 is deteriorated.

Meanwhile, in the case of the multilayer electronic component 100 according to the exemplary embodiment in the present disclosure, the second electrode layers 131b and 132b include a Ni—Cu alloy, and the Cu content of the second electrode layers 131b and 132b satisfy 70 mol to 90 mol compared to 100 mol of the total content of Ni and Cu of the second electrode layers 131b and 132b, and therefore, an average thickness td of the dielectric layer may be 0.4 µm or less, and in this case, the reliability improvement effect according to the present disclosure may be more remarkable.

Here, the average thickness td of the dielectric layer may refer to an average thickness of the dielectric layer 111 disposed between the internal electrodes 121 and 122. The average thickness td of the dielectric layer may be measured by scanning the cross-sections of the body 110 in the first direction and the second direction with a scanning electron microscope (SEM) having a magnification of 10,000. More specifically, the average value may be measured by measuring the thickness at a plurality of points of one dielectric layer 111, for example, at 30 points equally spaced apart in the second direction. The 30 points at equal intervals may be designated in a capacitance formation portion Ac, which will be described later. In addition, if the average value is measured by extending the measurement of the average value to ten dielectric layers 111, the average thickness of the dielectric layer 111 may be more generalized.

The internal electrodes 121 and 122 may be alternately disposed with the dielectric layer 111. For example, the first internal electrode 121 and the second internal electrode 122, which are a pair of electrodes having different polarities, may be disposed to face each other with the dielectric layer 111 interposed therebetween. The plurality of first internal electrodes 121 and the plurality of second internal electrodes 122 may be electrically isolated from each other by the dielectric layer 111 disposed therebetween.

The plurality of first internal electrodes 121 may be disposed to be spaced apart from the fourth surface 4 and connected to the third surface 3, respectively. In addition, the plurality of second internal electrodes 122 may be disposed to be spaced apart from the third surface 3 and connected to the fourth surface 4, respectively.

Conductive metals included in the internal electrodes 121 and 122 may be one or more of nickel (Ni), copper (Cu), palladium (Pd), silver (Ag), gold (Au), platinum (Pt), tin (Sn), tungsten (W), titanium (Ti), and alloys thereof, but the present disclosure is not limited thereto.

The internal electrodes 121 and 122 may be formed by applying a conductive paste for internal electrodes including a conductive metal to have a predetermined thickness on a ceramic green sheet and performing sintering. In this case, as a method for printing the conductive paste for internal electrodes, a screen-printing method or a gravure printing method maybe used, but the present disclosure is not limited thereto.

An average thickness te of the internal electrode is not particularly limited. In this case, the thicknesses of the internal electrodes 121 and 122 may refer to lengths of the internal electrodes 121 and 122 in the first direction. Meanwhile, as described above, in the case of the multilayer electronic component 100 according to the exemplary embodiment in the present disclosure, the second electrode layers 131b and 132b include a Ni—Cu alloy and the Cu content of the second electrode layers 131b and 132b satisfy 70 mol to 90 mol compared to the total content of 100 mol of Ni and Cu of the second electrode layers 131b and 132b, so that the average thickness te of the internal electrode may be 0.4 µm or less, and in this case, the reliability improvement effect according to the present disclosure may be remarkable.

Here, the average thickness te of the internal electrode may be measured by scanning the cross-sections of the body 110 in the first direction and the second direction with a scanning electron microscope (SEM) having a magnification of 10,000. More specifically, the average value may be measured by measuring the thickness at a plurality of points of one internal electrode 121 or 122, for example, at 30 points equally spaced in the second direction. The 30 points at equal intervals may be designated in a capacitance formation portion Ac, which will be described later. In addition, if the average value is measured by extending the measurement of the average value to ten internal electrodes 121 and 122, the average thickness of the internal electrodes 121 and 122 may be more generalized.

The body 110 may include a capacitance formation portion Ac including a plurality of first internal electrodes 121 and a plurality of second internal electrodes 122 formed inside the body 110 and arranged to face each other with the dielectric layer 111 therebetween to form capacitance and a first cover portion 112 and a second cover portion 113 disposed at both end surfaces of the capacitance formation portion Ac facing each other in the first direction. The cover portions 112 and 113 may basically serve to prevent damage to the internal electrodes due to physical or chemical stress. The cover portions 112 and 113 may have the same configuration as that of the dielectric layer 111 except that they do not include internal electrodes.

An average thickness tc of the cover portion is not particularly limited. However, the average thickness tc of the cover portion may be 20 µm or less in order to reduce the size and increase the capacitance of the multilayer electronic component. As described above, even when the average thickness tc of the cover portion is 20 µm or less, the Cu content of the second electrode layers 131b and 132b satisfies 70 mol to 90 mol compared to the total content of 100 mol of Ni and Cu, so that the reliability of the multilayer electronic component 100 may be further improved. Here, the average thickness tc of the cover portion refers to the average thickness of each of the first cover portion 112 and the second cover portion 113.

The average thickness of the cover portions 112 and 113 may refer to an average length of the cover portions 112 and 113 in the first direction, and may be a value obtained by averaging lengths in the first direction measured from the five points at equal intervals in the cross-section of the body 110 in the first direction and the second direction.

The body 110 may include margin portions 114 and 115 disposed on both end surfaces of the capacitance formation portion Ac facing each other in the third direction. That is, the margin portions 114 and 115 may refer to regions between both ends of the internal electrodes 121 and 122 in a cross-section of the body 110 taken in the first and third directions and an interface of the body 110. At this time, the margin portions 114 and 115 may include a first margin portion 114 connected to the fifth surface 5 of the body 110 and a second margin portion 115 connected to the sixth surface 6 of the body 110.

The margin portions 114 and 115 may include the same material as the dielectric layer 111 except that the internal electrodes 121 and 122 are not included. The margin portions 114 and 115 may basically serve to prevent damage to the internal electrodes 121 and 122 due to physical or chemical stress.

The margin portions 114 and 115 may be formed by applying and sintering a conductive paste for internal electrodes except where the margin portion is to be formed on the ceramic green sheet. Alternatively, in order to suppress a step difference caused by the internal electrodes 121 and 122, after stacking, the internal electrodes 121 and 122 are taken to be connected to the fifth and sixth surfaces 5 and 6 of the body, and then a single dielectric layer or two or more dielectric layers may be stacked on both end surfaces of the capacitance formation portion Ac facing each other in the third direction to form the margin portions 114 and 115.

An average thickness of the margin portions 114 and 115 is not particularly limited. However, the average thickness of the margin portions 114 and 115 may be 20 µm or less in order to reduce the size and increase the capacitance of the multilayer electronic component. As described above, even when the average thickness of the margin portions 114 and 115 is 20 µm or less, the Cu content of the second electrode layers 131b and 132b satisfies 70 mol to 90 mol compared to 100 mol of the total content of Ni and Cu, so that the reliability of the multilayer electronic component 100 may be further improved. Here, the average thickness of the margin portions 114 and 115 refers to the average thickness of each of the first margin portion 114 and the second margin portion 115.

The average thickness of the margin portions 114 and 115 may refer to an average length of the margin portions 114 and 115 in the third direction, and may be a value obtained by averaging lengths in the third direction measured from five points at equal intervals in the cross-section of the body 110 in the first direction and the third direction.

The external electrodes 131 and 132 may be disposed on the third and fourth surfaces 3 and 4 of the body 110 and may include a first external electrode 131 and a second external electrode 132 respectively connected to a plurality of first internal electrodes 121 and a plurality of second internal electrodes 122.

The external electrodes 131 and 132 may include first electrode layers 131a and 132a disposed on the third and fourth surfaces 3 and 4 of the body 110, connected to the internal electrodes 121 and 122, and including Ni, second electrode layers 132a and 132b disposed on the first electrode layers 131a and 132a and including an Ni—Cu alloy, and third electrode layers 131c and 132c disposed on the second electrode layers 132a and 132b.

Since the first electrode layers 131a and 132a include Ni, the occurrence of radial cracks may be suppressed. When Cu is used as a metal included in the first electrode layer and the internal electrode contains Ni, a rate at which Cu diffuses into Ni is much faster than a rate at which Ni diffuses into Cu, so a large amount of Cu diffuses toward the internal electrode to cause the volume of the internal electrode to expand, and thus, there is a risk of radial cracks.

In the present disclosure, since the first electrode layers 131a and 132a include Ni, expansion of the internal electrode volume may be suppressed, compared to the case in which the first electrode layers 131a and 132a include Cu, and accordingly, the occurrence of radial cracks may be suppressed. In addition, even when the internal electrode includes a metal other than Ni, since a diffusion rate of Cu is faster than that of most metals other than Ag, and thus, as the first electrode layers 131a and 132a include Ni, the expansion of the volume of the internal electrode may be suppressed, compared to the case in which the first electrode layers 131a and 132a include Cu.

From this point of view, the content of Ni included in the first electrode layers 131a and 132a may be greater than the content of Ni included in the second electrode layers 131b and 132b. That is, since the content of Ni included in the first electrode layers 131a and 132a connected to the internal electrodes 121 and 122 is greater than the content of Ni included in the second electrode layers 131b and 132b, expansion of the volume of the internal electrodes may be suppressed, thereby preventing the occurrence of radial cracks.

The Ni content of the first electrode layers 131a and 132a may refer to a Ni content of the first electrode layers 131a and 132a compared to the total content of 100 mol of Ni and Cu of the first electrode layers 131a and 132a. The Ni content of the second electrode layers 131b and 132b may refer to a Ni content of the second electrode layers 131b and 132b compared to the total content of 100 mol of Ni and Cu of the second electrode layers 131b and 132b. The Ni content of the first electrode layers 131a and 132a and the second electrode layers 131b and 132b may be measured by obtaining an image observing cross-sections of the first and second electrode layers taken in the first and second directions at the center of the body in the third direction with a scanning electron microscope (SEM) having a magnification of 1000 times or more and then performing component analysis on the image of cross-sections of the first and second electrode layers taken in the first and second directions from the center of the body in the third direction. After obtaining an image observed with a scanning electron microscope (SEM), the image may be measured by component analysis through energy disperse X-ray spectrometer (EDS).

In an exemplary embodiment, the first electrode layers 131a and 132a may be disposed only on the third and fourth surfaces 3 and 4, among the first to sixth surfaces 1 to 6 of the body 110. Accordingly, the flexural strength of the multilayer electronic component 100 may be improved, and an increase in the size of the multilayer electronic component 100 may be prevented, thereby improving the capacitance per unit volume.

However, since hydrogen gas and/or external moisture generated by a plating process tends to penetrate into the corners of the body 110 having a short distance to the internal electrodes 121 and 122, the end of the first electrode layer 131a of the first external electrode 131 may be disposed at the first-third corner C1-3 and the second-third corner C2-3, and the end of the first electrode layer 132a of the second external electrode 132 may be disposed on the first-fourth corner C1-4 and the second-fourth corner C2-4. Accordingly, it is possible to suppress the penetration of hydrogen gas and/or external moisture into the corner of the body 110.

In an exemplary embodiment, t1'/t1 is 0.8 or greater and 1.0 or less, in which t1 is a thickness of the first electrode layer 131a or 132a measured from the center of the body 110 in the first direction, and t1' is a thickness of the first electrode layer 131a or 132a measured from the internal electrode disposed at the outermost portion of the body in the first direction. As the first electrode layers 131a and 132a have a uniform thickness, the thickness of the first electrode layer may be formed to be thin, thereby improving the capacitance per unit volume of the multilayer electronic component.

Meanwhile, the method for controlling t1'/t1 to be 0.8 or more and 1.0 or less is not particularly limited. For example, t1'/t1 may be controlled to be 0.8 or more and 1.0 or less through a process of transferring a sheet containing Ni to the third and fourth surfaces 3 and 4 of the body 110 and then performing sintering or a process of compressing the body 110 to the sheet containing Ni to attach the sheet to the body 110 and performing sintering. t1 and t1' may be measured by observing the cross-section of the first electrode layer taken in the first and second directions from the center of the body in the third direction with a scanning electron microscope (SEM) having a magnification of 2000 times or more.

In addition, an average thickness of the first electrode layers 131a and 132a is not particularly limited, but may be 9 μm or less in order to improve the capacitance per unit volume of the multilayer electronic component. The average thickness of the first electrode layers 131a and 132a may be measured from a cross-section of the multilayer electronic component taken in the first and second directions at the center of the body 110 in the third direction, and may be a value obtained by averaging the thicknesses measured at five points at equal intervals in the first direction. In addition, the average thickness of the first electrode layers 131a and 132a may be measured by observing cross-sections of the first electrode layers 131a and 132a in the first and second directions at the center of the body 110 in the third direction with a scanning electron microscope (SEM) having a magnification of 2000 times or more. A lower limit of the average thickness of the first electrode layers 131a and 132a is not particularly limited, but may be, for example, 0.1 μm or more.

In an exemplary embodiment, the first electrode layers 131a and 132a may further include glass. Since the first electrode layers 131a and 132a disposed on the third and fourth surfaces 3 and 4 of the body 110 include glass, bonding strength with the body 110 may be improved.

The second electrode layers 131b and 132b may include a Ni—Cu alloy. Since the second electrode layers 131a and 132a include the Ni—Cu alloy, it is possible to suppress penetration of hydrogen gas into the internal electrodes 121 and 122 as compared to the case in which the second electrode layer includes Ni or Cu alone.

In this case, the Cu content of the second electrode layers 131b and 132b may be 70 mol to 90 mol compared to 100 mol of the total content of Ni and Cu of the second electrode layers 131b and 132b. Since the Cu content of the second electrode layers 131b and 132b satisfies 70 mol to 90 mol compared to 100 mol of the total content of Ni and Cu of the second electrode layers 131b and 132b, the penetration of hydrogen gas into the internal electrodes 121 and 122 may be more effectively suppressed, thereby improving insulation resistance and reliability of the multilayer electronic component.

The applicant confirmed that when the second electrode layers 131b and 132b include a Ni—Cu alloy, the penetration of hydrogen gas may be suppressed compared to the case in which the second electrode layer includes Ni or Cu alone, and in particular, confirmed that when the Cu content of the second electrode layers 131b and 132b satisfies 70 mol to 90 mol compared to 100 mol of the total content of Ni and Cu of the second electrode layers 131b and 132b, the hydrogen penetration suppression effect is more remarkable.

That is, if the Cu content of the second electrode layers 131b and 132b is less than 70 mol or more than 90 mol compared to 100 mol of the total content of Ni and Cu of the second electrode layers 131b and 132b, the density of the second electrode layers 131b and 132b may be lowered, making it impossible to form an electrode, or hydrogen gas and/or external moisture may easily penetrate into the body 110 through pores generated in the second electrode layers 131b and 132b, thereby reducing the reliability of the multilayer electronic component.

The second electrode layers 131b and 132b may extend to a portion of each of the first, second, fifth and sixth surfaces 1, 2, 5, and 6 of the body 110, thereby more effectively suppressing the penetration of hydrogen gas and/or external moisture through the corner of the body 110.

The Cu content of the second electrode layers 131b and 132b may be a value obtained by obtaining an image observing cross-sections of the second electrode layer taken in the first and second directions at the center of the body in the third direction with a scanning electron microscope (SEM) having a magnification of 1000 times or more, performing component analysis on a certain ten points spaced apart from each other by 1 μm or more in the metal region, excluding the glass region of the second electrode, and then averaging the Cu content at the measured ten points.

In an exemplary embodiment, a standard deviation of the Cu content compared to 100 mol of the total content of Ni and Cu of the second electrode layers 131b and 132b may be 3.21 mol or less. The fact that the standard deviation of the Cu content of the second electrode layers 131b and 132b satisfies 3.21 mol or less compared to the total content of Ni and Cu of 100 mol means that Cu contained in the second electrode layers 131b and 132b is uniformly distributed in the second electrode layers 131b and 132b.

When the standard deviation of the Cu content of the second electrode layers 131b and 132b satisfies 3.21 mol or less compared to 100 mol of the total content of Ni and Cu, Cu may be uniformly distributed in the second electrode layers 131b and 132b, so that the second electrode layers 131b and 132b may not include regions vulnerable to penetration of hydrogen gas. A lower limit of the standard deviation of the Cu content of the second electrode layers 131b and 132b is not particularly limited, but may be, for example, 0.01 mol or more compared to 100 mol of the total content of Ni and Cu.

Meanwhile, a method for controlling the standard deviation of the Cu content of the second electrode layers 131b and 132b to be 3.21 mol or less is not particularly limited. For example, the standard deviation of the Cu content of the second electrode layers 131b and 132b may be controlled to be 3.21 mol or less by forming the second electrode layer through a conductive paste containing Ni—Cu alloy powder or by controlling the conditions for sintering the applied conductive paste.

The standard deviation of the Cu content of the second electrode layers 131b and 132b may be measured through a Cu content of each point after obtaining an image observing a cross-section of the second electrode layer taken in the first and second directions at the center of the body in the third direction with a scanning electronic microscope (SEM) having a magnification of at least 1,000 times, and then performing component analysis on certain ten points spaced apart from each other by 1 μm or more within a metal region excluding a glass region of the second electrode layer through an energy disperse X-ray spectrometer (EDS).

The second electrode layers 131b and 132b may further include at least one of Sn, Bi, Al, Ag, Zn, Au, In, Ga, Ge, Si, and alloys thereof. The metals may effectively suppress the penetration of hydrogen gas together with the Ni—Cu alloy.

The second electrode layers 131b and 132b may further include glass. The glass included in the second electrode layers 131b and 132b may increase density of the second electrode layer by filling pores formed when the metal powder, e.g., Ni—Cu alloy powder, included in the conductive paste forming the second electrode layer is contracted during a sintering process.

The third electrode layers 131c and 132c may improve mounting characteristics. The third electrode layers 131c and 132c is not particularly limited in type and may be plating layers including Ni, Sn, Pd and/or an alloy including the same, or may be formed of a plurality of layers. The third electrode layers 131c and 132c may be, for example, Ni plating layers or Sn plating layers and may have a form in which the Ni plating layer and the Sn plating layer are sequentially formed. In addition, the third electrode layers 131c and 132c may include a plurality of Ni plating layers and/or a plurality of Sn plating layers.

The first external electrode 131 may include a first connection portion A1 disposed on the third surface of the body 110 and a first band portion B1 extending to a portion of each of the first surface 1, the second surface 2, the fifth surface 5, and the sixth surface 6 of the body 110 from the first connection portion A1, and the second external electrode 132 may include a second connection portion A2 disposed on the fourth surface of the body 110 and a second band portion B2 extending to a portion of each of the first surface 1, the second surface 2, the fifth surface 5, and the sixth surface 6 of the body 110 from the second connection portion A2.

The average thickness of the band portions B1 and B2 is not particularly limited. However, in an exemplary embodiment, the average thickness of the band portions B1 and B2 may be 10 μm or more. Here, the thickness of the band portions B1 and B2 refers to a length of the band portions B1 and B2 in the first direction and refers to the average thickness of each of the first band portion B1 and the second band portion B2. Since the band portions B1 and B2 are relatively thinner than the connection portions A1 and A2, hydrogen gas may easily penetrate the band portions B1 and B2. Therefore, the average thickness of the band portions B1 and B2 is formed to be 10 μm or more, so that penetration of hydrogen gas may be more effectively suppressed. Meanwhile, an upper limit of the average thickness of the band portions B1 and B2 is not particularly limited, but may be 15 μm or less in consideration of the capacitance per unit volume.

The average thickness of the band portions B1 and B2 may be an average value of thicknesses measured from five points at uniform intervals in the second direction. In addition, average thickness of the band portions B1 and B2 may be measured by observing the cross-sections of the external electrodes 131 and 132 in the first direction and the second direction at the center of the body 110 in the third direction with a scanning electron microscope (SEM) having a magnification of 2000 times or more.

From the same viewpoint, a length L1 of the first band portion B1 in the second direction is not particularly limited, but may be, for example, 10 μm or more. When the length L1 of the first band portion in the second direction is 10 μm or more, the penetration of hydrogen gas may be more effectively suppressed. Meanwhile, an upper limit of the length L1 of the first band portion in the second direction is not particularly limited, but may be, for example, 15 μm or less. In addition, since the second band portion B2 may have a symmetrical relationship with the first band portion B1 in the second direction, the same may be applied to the second band portion B2.

Here, the length L1 of the first band portion B1 in the second direction may refer to a distance from the third surface of the body 110 to the end of the first external electrode 131 in the second direction, and the length B2 of the second band portion B2 in the second direction may refer to a distance from the fourth surface of the body 110 to the end of the second external electrode 132 in the second direction. In addition, the length of the band portions B1 and B2 in the second direction may be measured by observing the cross-sections of the external electrodes 131 and 132 in the first direction and the second direction at the center of the body in the third direction with a scanning electron microscope (SEM) having a magnification of 2000 times or more.

Figure 6:
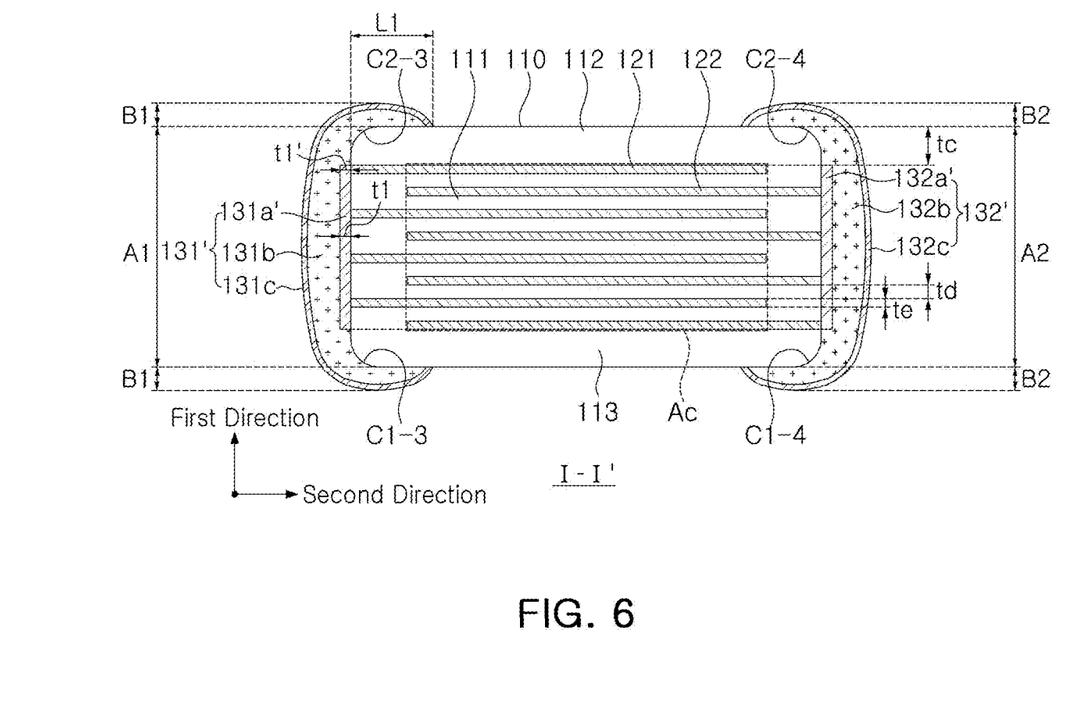
FIG. 6 is a modified example of FIG. 4.

FIG. 6 is a modified example of FIG. 4.

According to a modified example of the present disclosure, the first electrode layers 131a' and 132a' may be Ni plating layers. When the first electrode layers 131a' and 132a' are Ni plating layers, the aforementioned radial cracks may be more effectively suppressed, and the capacitance per unit volume may be improved by reducing the thickness of the external electrodes 131' and 132'.

Hereinafter, a multilayer electronic component according to another exemplary embodiment in the present disclosure will be described. However, the multilayer electronic component according to another exemplary embodiment in the present disclosure may have the same configuration as the multilayer electronic component according to the exemplary embodiment in the present disclosure described above. Therefore, redundant descriptions overlapping those of the exemplary embodiment in the present disclosure described above will be omitted.

A multilayer electronic component 100 according to an exemplary embodiment in the present disclosure includes a body including a dielectric layer 111 and internal electrodes 121 and 122 stacked in a first direction with the dielectric layer 111 interposed therebetween and including a first surface 1 and a second surface 2 opposing each other in the first direction, a third surface 3 and a fourth surface 4 connected to the first surface 1 and the second surface 2 and opposing each other in a second direction, and a fifth surface 5 and a sixth surface 6 connected to the first to fourth surfaces 1 to 4 and opposing each other in a third direction; and external electrodes 131' and 132' including first electrode layers 131a' and 132a' connected to the internal electrodes and including Ni, and second electrode layers 131b and 132b disposed on the first electrode layers and including an Ni—Cu alloy. The first electrode layers 131a' and 132a' are disposed only on the third and fourth surfaces 3 and 4, among the first to sixth surfaces 1 to 6, and the second electrode layers 131b and 132b extend to a portion of each of the first, second, fifth, and sixth surfaces 1, 2, 5, and 6.

In the multilayer electronic component 100 according to an exemplary embodiment in the present disclosure, since the first electrode layers 131a' and 132a' are disposed only on the third and fourth surfaces 3 and 4 among the first to sixth surfaces 1 to 6 of the body 110, the flexural strength of the electronic component 100 may be improved and an increase in the size of the multilayer electronic component 100 may be prevented, thereby improving capacitance per unit volume.

In addition, since the second electrode layers 131a and 132a include a Ni—Cu alloy, the penetration of hydrogen gas into the internal electrodes 121 and 122 may be suppressed, compared to a case in which the second electrode layer includes Ni or Cu alone, and since the second electrode layers 131b and 132b extend to a portion of each of the first surface 1, the second surface 2, the fifth surface 5, and the sixth surface 6 of the body 110, the penetration of hydrogen gas and/or external moisture through the corner of the body 110 may be more effectively suppressed. Thereby, deterioration of insulation resistance may be suppressed and the reliability of a multilayer electronic component may be further improved.

Experimental Example

<Analysis of Cu Content and Standard Deviation of Second Electrode Layer>

First, a slurry containing barium titanate ($BaTiO_3$) powder was applied on a carrier film and dried to prepare a plurality of ceramic green sheets. Thereafter, a conductive paste for internal electrodes was applied on the ceramic green sheet, the ceramic green sheets coated with the conductive paste for internal electrodes were laminated a plurality of times and then sintered to form a body including a dielectric layer and internal electrodes.

The body was compressed on a sheet containing Ni on the body to attach the sheet to the body and sintered to form a first electrode layer, and the body on which the first electrode layer is formed is dipped into a conductive paste containing Ni—Cu alloy powder and then sintered to prepare a sample chip in which a second electrode layer was formed on the first electrode layer.

Figure 7:
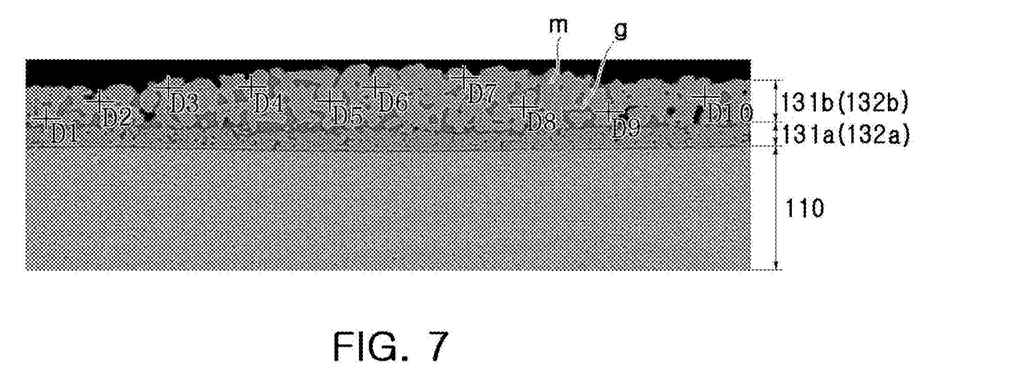
FIG. 7 is a scanning electronic microscope (SEM) image of a cross-section of a multilayer electronic component according to an exemplary embodiment in the present disclosure.

FIG. 7 is a scanning electronic microscope (SEM) image of a cross-section of a multilayer electronic component according to an exemplary embodiment in the present disclosure.

As shown in FIG. 7, after the sample chip is cut in the first and second directions at the center of the body 110 in the third direction, cross-sections of the second electrode layers 131b and 132b were observed with a scanning electron microscope (SEM) having a magnification of 1000 times or more to obtain an image. Thereafter, in the image, component analysis was performed on a certain ten points D1 to D10 spaced apart from each other by 1 μm or more in a metal region m excluding a glass region g of the second electrode layers 131b and 132b in the image through energy disperse X-ray spectrometer (EDS).

Figure 8:
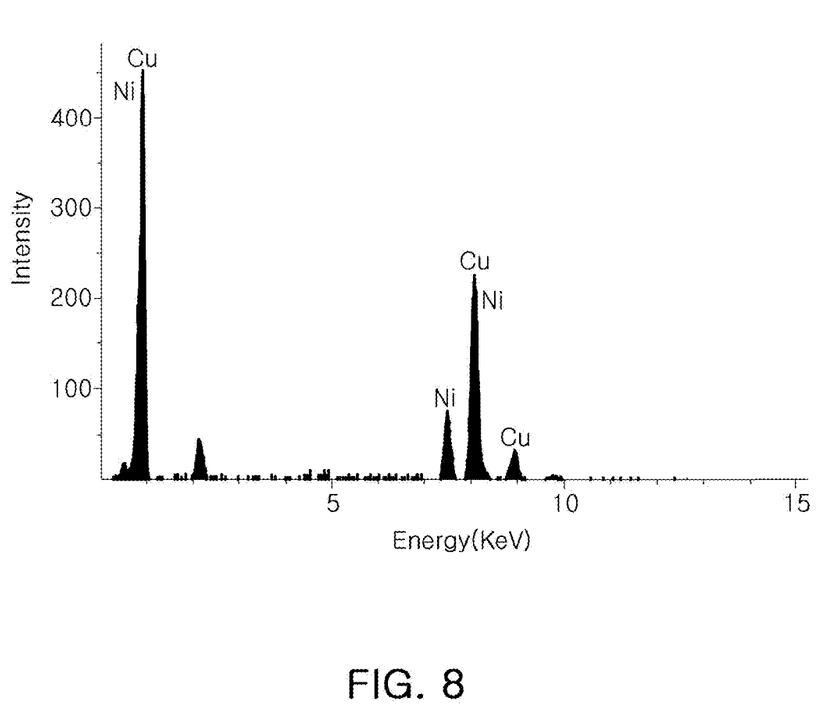
FIG. 8 is a result of analyzing a point D1 of FIG. 7 using an energy disperse X-ray spectrometer (EDS).

FIG. 8 is a result of analyzing the point D1 of FIG. 7 using the energy disperse X-ray spectrometer (EDS). Thereafter, values obtained by averaging Cu contents with respect to 100 mol of a total content of Ni and Cu at points D1 to D10 measured through the EDS analysis results and a standard deviation of the Cu content with respect to 100 mol of the total content of Ni and Cu are described in Table 1 below.

<Reliability Test>

A high temperature reliability test was performed to evaluate the Cu content of the second electrode layer and the insulation resistance according to the standard deviation of the Cu content. For the high temperature reliability test, an Ni plating layer and a Sn plating layer were sequentially formed on the second electrode layers of 400 samples for each specimen No. below, and mounted on a substrate, and thereafter, insulation resistance was measured by applying a rated voltage 1.2 V for two hours under the conditions of a relative humidity of 85% and 85° C. Here, when the insulation resistance of all samples maintained $10^7 \Omega$ or more, it was determined as good (◯), and when the insulation resistance of even one sample did not maintain $10^7 \Omega$ or more, it was determined as poor (X), and described in Table 1 below.

TABLE 1

| Specimen No. | Cu content (mol/Ni + Cu) | Cu standard deviation (mol/Ni + Cu) | Evaluation of reliability |
|---|---|---|---|
| 1* | 60 | Measurement unavailable | X |
| 2 | 70 | 1.92 | ◯ |
| 3 | 79.3 | 2.08 | ◯ |
| 4 | 80.4 | 2.75 | ◯ |
| 5 | 81.4 | 3.08 | ◯ |
| 6 | 90 | 3.21 | ◯ |
| 7* | 100 | — | X |

*is comparative example

In Specimen Nos. 1 and 7, it was confirmed that the Cu content was less than 70 mol or more than 90 mol compared to 100 mol of the total content of Ni and Cu, resulting in a defect in the reliability test. In addition, in the case of Specimen No. 1, it was impossible to form the second electrode layer because the density was not implemented, and accordingly, it was impossible to measure a standard deviation of the Cu content. Meanwhile, in Specimen Nos. 2 to 6, the Cu content of the second electrode layer was in the range of 70 mol to 90 mol, compared to 100 mol of the total content of Ni and Cu and the standard deviation of the Cu content with respect to 100 mol of the total content of Ni and Cu satisfied 3.21 mol or less, so that it was confirmed that no defects occurred in the reliability test. In particular, when the Cu content of the second electrode layer was in the range of 70 mol to 80 mol compared to 100 mol of the total content of Ni and Cu of the second electrode layer, the standard deviation of the Cu content of the second electrode layers was relative small, indicating that Cu contained in the second electrode layers was more uniformly distributed in the second electrode layers.

From this, it can be seen that the multilayer electronic component in which the Cu content of the second electrode layer and the standard deviation thereof are within a predetermined range has excellent reliability.

While example embodiments have been shown and described above, it will be apparent to those skilled in the art that modifications and variations could be made without departing from the scope of the present invention as defined by the appended claims.

What is claimed is:

1. A multilayer electronic component comprising:
    a body including a dielectric layer and internal electrodes stacked in a first direction with the dielectric layer interposed therebetween; and
    external electrodes including a first electrode layer connected to the internal electrodes and including Ni, and a second electrode layer disposed on the first electrode layer and including an Ni—Cu alloy,
    wherein a Cu content of the second electrode layer is 70 mol to 90 mol compared to 100 mol of the total content of Ni and Cu of the second electrode layer.

2. The multilayer electronic component of claim 1, wherein
    a standard deviation of the Cu content compared to the total content of 100 mol of Ni and Cu of the second electrode layer is 3.21 mol or less.

3. The multilayer electronic component of claim 1, wherein
    a content of Ni included in the first electrode layer compared to 100 mol of the total content of Ni and Cu of the first electrode layer is greater than a content of Ni included in the second electrode layer compared to 100 mol of the total content of Ni and Cu of the second electrode layer.

4. The multilayer electronic component of claim 1, wherein
    the body includes a first surface and a second surface opposing each other in the first direction, a third surface and a fourth surface connected to the first surface and the second surface and opposing each other in a second direction, and a fifth surface and a sixth surface connected to the first to fourth surfaces and opposing each other in a third direction, and
    the first electrode layer is disposed only on the third and fourth surfaces, among the first to sixth surfaces.

5. The multilayer electronic component of claim 4, wherein
    the second electrode layer extends to a portion of each of the first, second, fifth, and sixth surfaces.

6. The multilayer electronic component of claim 1, wherein
    t1'/t1 is 0.8 or greater and 1.0 or less, in which t1 is a thickness of the first electrode layer measured from a center of the body in the first direction, and t1' is a thickness of the first electrode layer measured from the internal electrode disposed at an outermost portion of the body in the first direction.

7. The multilayer electronic component of claim 1, wherein
    the first electrode layer further includes glass.

8. The multilayer electronic component of claim 1, wherein
    the first electrode layer is a Ni plating layer.

9. The multilayer electronic component of claim 1, wherein
    the external electrodes include a third electrode layer disposed on the second electrode layer, and
    the third electrode layer includes a first layer containing Ni and a second layer containing Sn.

10. The multilayer electronic component of claim 1, wherein
an average thickness of the dielectric layer is 0.4 μm or less.

11. The multilayer electronic component of claim 1, wherein
an average thickness of the internal electrodes is 0.4 μm or less.

12. The multilayer electronic component of claim 1, wherein
an average thickness of the first electrode layer is 9 μm or less.

13. The multilayer electronic component of claim 1, wherein
the Cu content of the second electrode layer is 70 mol to 80 mol compared to 100 mol of the total content of Ni and Cu of the second electrode layer.

14. A multilayer electronic component comprising:
a body including a dielectric layer and internal electrodes stacked in a first direction with the dielectric layer interposed therebetween and including a first surface and a second surface opposing each other in the first direction, a third surface and a fourth surface connected to the first surface and the second surface and opposing each other in a second direction, and a fifth surface and a sixth surface connected to the first to fourth surfaces and opposing each other in a third direction; and
external electrodes including a first electrode layer connected to the internal electrodes and including Ni, and a second electrode layer disposed on the first electrode layer and including an Ni—Cu alloy,
wherein the first electrode layer is disposed only on the third and fourth surfaces, among the first to sixth surfaces, and the second electrode layer extends to a portion of each of the first, second, fifth, and sixth surfaces, and
each of the first electrode layer and the second electrode layer includes glass.

15. The multilayer electronic component of claim 14, wherein
a standard deviation of the Cu content compared to the total content of 100 mol of Ni and Cu of the second electrode layer is 3.21 mol or less.

16. The multilayer electronic component of claim 14, wherein
a content of Ni included in the first electrode layer is greater than a content of Ni included in the second electrode layer.

17. The multilayer electronic component of claim 14, wherein
t1'/t1 is 0.8 or greater and 1.0 or less, in which t1 is a thickness of the first electrode layer measured from a center of the body in the first direction, and t1' is a thickness of the first electrode layer measured from the internal electrode disposed at an outermost portion of the body in the first direction.

18. The multilayer electronic component of claim 14, wherein
the external electrode includes a third electrode layer disposed on the second electrode layer, and
the third electrode layer includes a first layer containing Ni and a second layer containing Sn.

19. The multilayer electronic component of claim 14, wherein
an average thickness of the dielectric layer is 0.4 μm or less.

20. The multilayer electronic component of claim 14, wherein
an average thickness of the internal electrodes is 0.4 μm or less.

* * * * *